US012255476B1

(12) United States Patent
Gomez

(10) Patent No.: US 12,255,476 B1
(45) Date of Patent: Mar. 18, 2025

(54) WIRELESS CHARGING FARADAY CONTAINER

(71) Applicant: Joseph Anthony Gomez, Cape Coral, FL (US)

(72) Inventor: Joseph Anthony Gomez, Cape Coral, FL (US)

( * ) Notice: Subject to any disclaimer, the term of this patent is extended or adjusted under 35 U.S.C. 154(b) by 535 days.

(21) Appl. No.: 17/362,838

(22) Filed: Jun. 29, 2021

Related U.S. Application Data

(60) Provisional application No. 63/181,510, filed on Apr. 29, 2021.

(51) Int. Cl.
| | |
|---|---|
| *H01M 10/46* | (2006.01) |
| *H01F 27/34* | (2006.01) |
| *H02J 7/00* | (2006.01) |
| *H02J 7/02* | (2016.01) |

(52) U.S. Cl.
CPC .......... *H02J 7/0044* (2013.01); *H01F 27/346* (2013.01); *H02J 7/02* (2013.01)

(58) Field of Classification Search
CPC .......... H02J 7/0044; H02J 7/02; H02J 7/0042; H02J 50/005; H02J 50/10; H02J 50/90; H01F 27/346
USPC ................................ 320/107, 108, 114, 115
See application file for complete search history.

(56) References Cited

U.S. PATENT DOCUMENTS

| | | | |
|---|---|---|---|
| 6,597,255 B1 | 7/2003 | Turton | |
| 9,825,662 B2 | 11/2017 | Mian et al. | |
| 10,340,711 B2 | 7/2019 | Graham et al. | |
| 10,418,699 B2 | 9/2019 | Anderson et al. | |
| 2011/0057609 A1* | 3/2011 | Smith | H02J 50/90 320/108 |
| 2012/0112690 A1* | 5/2012 | Stulen | A61B 17/320092 320/108 |
| 2018/0090959 A1* | 3/2018 | Orr | H02J 7/0031 |
| 2021/0083523 A1* | 3/2021 | Olgun | H02J 50/23 |

FOREIGN PATENT DOCUMENTS

| | | | | | |
|---|---|---|---|---|---|
| CN | 111371158 A | * | 7/2020 | .............. | H02J 50/20 |
| WO | WO-2019186177 A1 | * | 10/2019 | .............. | H02J 50/10 |

OTHER PUBLICATIONS

Translation of CN111371158A. Feb. 1, 2016 (Year: 2016).*
Bayerische Motoren Werke AG, "BMW Wireless Charging. BMW 5 Series iPerformance," Sep. 22, 2017, https://www.youtube.com/watch?v=GlrcPrzuPMM.

(Continued)

*Primary Examiner* — Edward Tso
(74) *Attorney, Agent, or Firm* — George F. Wallace

(57) ABSTRACT

A wireless charging Faraday container can include a container formed of a conductive material defining a cavity for protective storage of an electronic device; a wireless power transmitter positioned outside of the cavity; and a wireless power receiver positioned within the cavity and in wireless electrical communication with the transmitter. The transmitter is configured to convert received electrical current to wireless energy and to transmit the wireless energy through the container to the receiver, and the receiver is configured to receive and convert the wireless energy to electricity and to provide the electricity to the at least one electronic device.

8 Claims, 1 Drawing Sheet

(56) References Cited

OTHER PUBLICATIONS

Jhbodle, "Can you charge the Display Key wirelessly in a Faraday bag?," Bimmerpost, Oct. 14, 2018, https://g30.bimmerpost.com/forums/showthread.php?t=1544996.

Babouri, "Experimental and Theoretical Investigation of Implantable Cardiac Pacemaker Exposed to Low Frequency Magnetic Field," Feb. 2009, Journal of Clinical Monitoring and Computing.

MOS Equipment, "Mission Darkness(TM) Non-Window Charge & Shield Faraday Bag," May 24, 2021 or earlier, https://mosequipment.com/products/mission-darkness-neolok-faraday-bag-for-tablets-with-usb-filter.

* cited by examiner

WIRELESS CHARGING FARADAY CONTAINER

RELATED DOCUMENTS

This application relates to, incorporates by reference in their entireties, and claims the priority benefits of U.S. Provisional Patent Application Ser. No. 63/181,510 entitled "Secured Wireless Charging Device" and filed on Apr. 29, 2021 by Joseph Anthony Gomez; and co-pending U.S. patent application Ser. No. 17/362,829, entitled "Secured Wireless Charging Device" and filed on Jun. 29, 2021 by Joseph Anthony Gomez.

FIELD OF THE INVENTION

The present invention relates to wireless charging systems and protective containers.

BACKGROUND OF THE INVENTION

Wireless charging systems can include a wireless power transmitter and a wireless power receiver, and can provide a wireless charging functionality without the need for a long physical wire connecting a power source to an electronic device to be charged.

A Faraday cage is an enclosure formed of a conductive material that can block electromagnet fields from reaching or acting on contents within the cage. Electrical fields external to such a cage can cause electric charges within the container's conductive material to be distributed, which can cancel the electric field's effect on the interior of the container.

SUMMARY OF THE INVENTION

It is an object of the present invention to provide a wireless charging Faraday container.

It is another object of the present invention to provide a wireless charging Faraday container that overcomes at least one deficiency in the prior art.

The present invention provides a wireless charging Faraday container that includes a Faraday container formed of a conductive material defining a cavity therein, a wireless power transmitter positioned outside the cavity, and a wireless power receiver positioned within the cavity. The transmitter and receiver can wireless communicate through the container energy that can be used by an electronic device within the cavity.

The wireless power transmitter and receiver can utilize any one or more wireless power communication technologies and/or protocols desired, in whole or in part, including but not limited to, magnetic resonance, magnetic induction, radio frequency harvesting, sound waves, and any future developed wireless power communication technology or protocol, for example and not in limitation. Notably, depending on the desired communication technology implemented, any one or more required ancillary components and aspects needed for effectuation of such communication are deemed within the scope of the present invention. For example and not in limitation, such components can include one or more coils of any desired number, shape, and size; whilst such aspects can include the generation of, and conversion to energy from, a magnetic field, radio frequency waves, and/or sound waves, for example and not in limitation.

In exemplary aspects, a container can be formed of a conductive material defining a cavity therein, and can include an outer surface and a sealable opening.

In another exemplary aspect, such a sealable opening can have an open state that exposes the cavity for placement of an electronic device within the cavity, and a closed state that seals the electronic device within the cavity.

In a further exemplary aspect, a wireless power transmitter can be positioned outside of the container at any distance functionally compatible with the communication technology utilized, and the transmitter can be configured to receive electrical current from a power source. Optionally, a wireless power receiver can be securely fixed to an inner surface of, or in any other position within, the container.

In still another exemplary aspect, a wireless power receiver can be positioned within the cavity and can be in wireless electrical communication with the transmitter. Notably, a wireless power receiver can be securely fixed to an inner surface of, or in any position within, the container.

In still a further exemplary aspect, such a transmitter can be configured to convert received electrical current to wireless energy and can transmit the wireless energy through the material to the receiver.

In still yet another exemplary aspect, such a receiver can be configured to receive and convert the wireless energy to electricity and to provide the electricity to the electronic device.

The following optional exemplary aspects can apply to any embodiment of a secured wireless charging device:
  the material can be formed at least in part from one or
     more of a non-porous material, an insulating material,
     and a conductive material;
  the closed state can provide a water resistant seal;
  the wireless power transmitter can be removably fixed to
     the container;
  the received electrical current can be direct current or
     alternating current;
  the cavity can be at least 20 cubic inches; and
  the cavity can be at least 25 cubic inches.

DETAILED DESCRIPTION

It is an object of the present invention to provide a secured wireless charging device.

It is an object of the present invention to provide a secured wireless charging device that provides functional utility.

It should be noted that this disclosure includes a plurality of embodiments each having a plurality of elements, aspects, and/or steps and such elements, aspects, and/or steps need not necessarily be interpreted as being conjunctively required by one or more embodiments of the present invention. In particular, all combinations of such elements, aspects, and/or steps can enable a separate embodiment of the present invention, which may be claimed with particularity in any future filed Patent Application. Moreover, such elements, aspects, and/or steps disclosed herein, whether expressly or implicitly, are to be construed strictly as illustrative and enabling, and not necessarily limiting. Therefore, it is expressly set forth that any elements, aspects, and/or steps, independently or in any combination of one of more thereof, are merely illustratively representative of one or more embodiments of the present invention and are not to be construed as necessary in a strict sense.

Further, to the extent the same element and/or aspect is defined differently anywhere within this disclosure, whether expressly or implicitly, the broader definition is to take absolute precedence, with the distinctions encompassed by the narrower definition to be strictly construed as optional.

Illustratively, perceived benefits of the present invention can include functional utility, whether expressly or implicitly stated herein, or apparent herefrom. However, it is expressly set forth that these benefits are not intended as exclusive. Therefore, any explicit, implicit, or apparent benefit from the disclosure herein is expressly deemed as applicable to the present invention.

Figure 2:
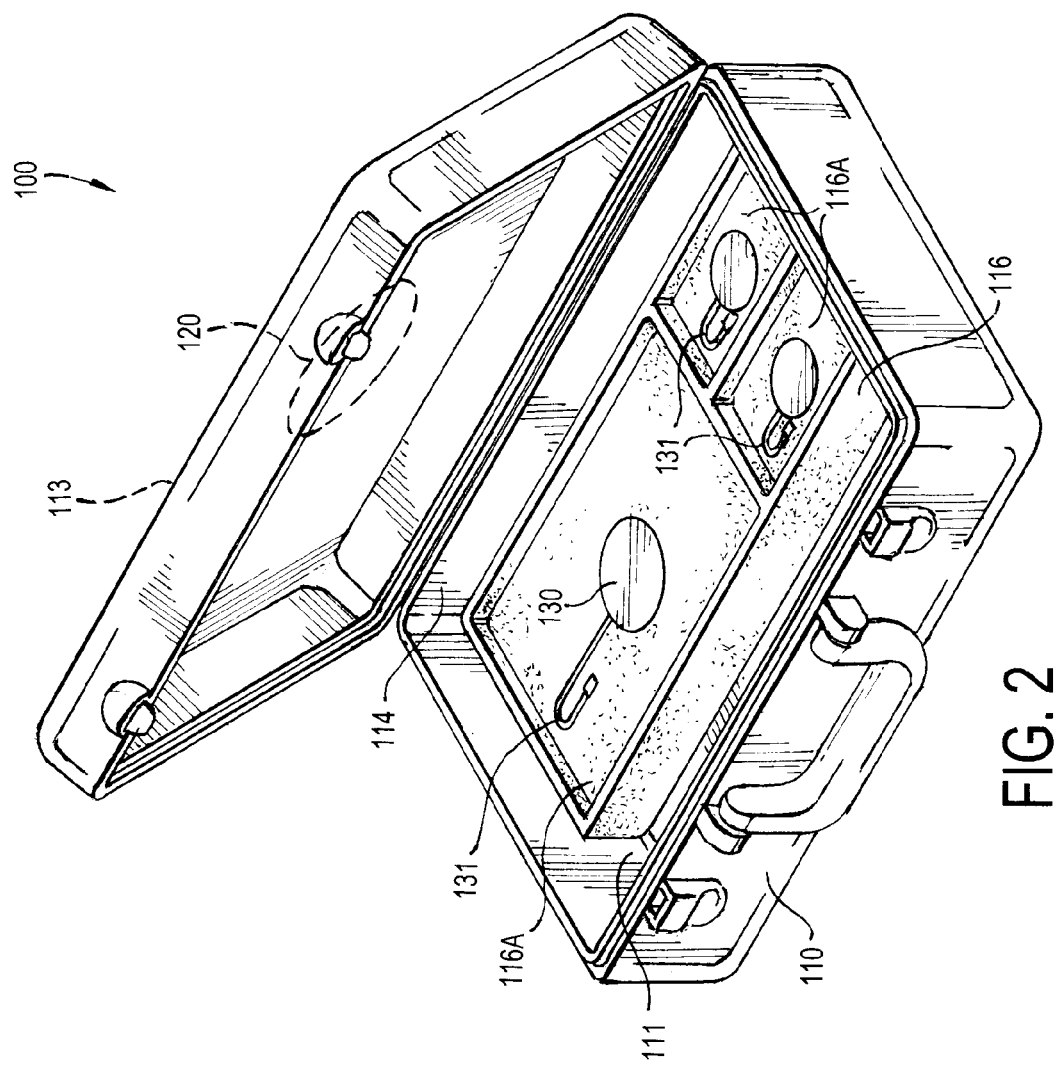
FIG. 2 illustrates another exemplary embodiment of a secured wireless charging device having a container provided as a hard case, a wireless power transmitter, and plural wireless power receivers.
Figure 1:
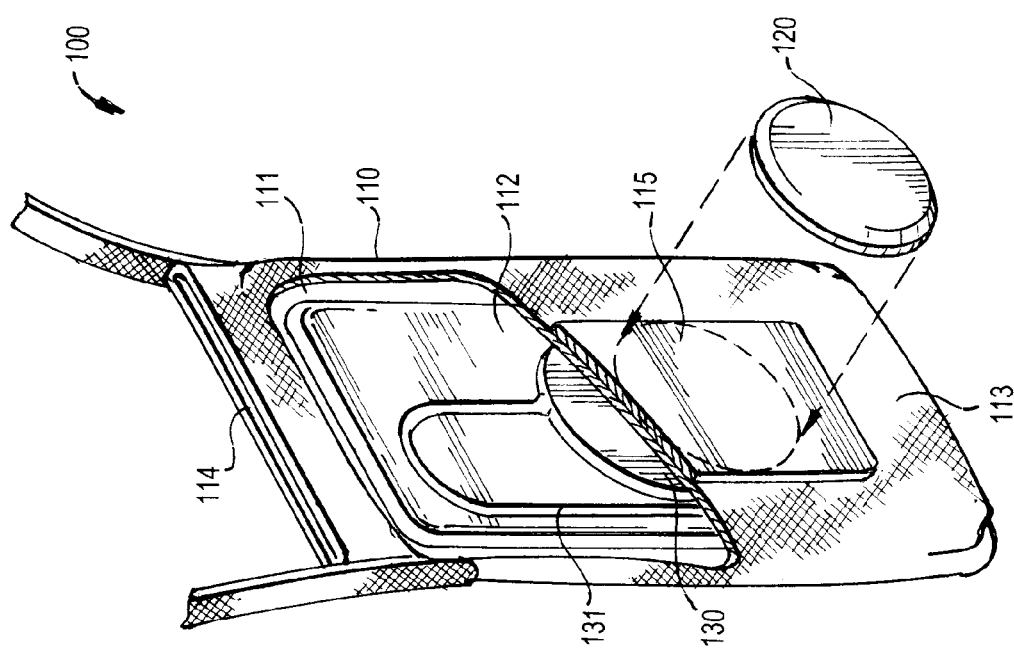
FIG. 1 illustrates an exemplary embodiment of a secured wireless charging device having a container provided as a pouch, a wireless power transmitter, and a wireless power receiver.

FIG. 1 illustrates an exemplary secured wireless charging device embodied in a carry bag, whilst FIG. 2 illustrates an exemplary secured wireless device embodied in a hard case.

FIGS. 1 and 2 illustrate exemplary embodiments of the present invention, in which a secured wireless charging device 100 can include a protective container 110 having a cavity 111 therein, a wireless power transmitter 120 positioned outside of the container, and a wireless power receiver 130 positioned within the cavity.

In an exemplary aspect, container 110 can protect its contents from one or more undesired environmental conditions or situations, such as water, sound, humidity, temperature, debris, gas, electric field, magnetic field, electromagnetic radiation, static electricity, electrical conduction, theft, unauthorized access, eavesdropping, viewing, and structural damage from physical forces, for example and not in limitation. Further, container 110 can be provided with any desired size or shape, whether geometric or irregular, insofar as functionally compatible with the present invention as described. In exemplary embodiments, container 110 can be one or more of a safe; an anti-static bag; a hard case, such as a PELICAN case; a waterproof container; a Sensitive Compartmented Information Facility ("SCIF"); or a Faraday container.

In another exemplary aspect, container 110 can be formed of one or more particular materials (which can optionally include one or more protective structures, such as braces, for example) selected to achieve any or more particular type of protection desired, insofar as such one or more materials are functionally compatible with the present invention. For example and not in limitation, such one or more materials can include lead, an electrostatic discharge ("ESD") material, plastic, rubber, metal, a conductive material, a crystalline material, a naturally occurring material, or a synthetic material. Moreover, such one or more materials can include one or more apertures, openings, and/or slots insofar as desired and functionally consistent with the present invention.

As further illustrated in FIG. 1, container 110 can include a cavity 111, in which an electronic device 112 can be disposed. Container 110 can include an outer surface 113 and a sealable opening 114.

In another exemplary aspect, cavity 111 can be configured to have any desired shape or size to accommodate items desirably contained therein. For example and not in limitation, cavity 111 can have a volume of at least about 5 to 50 cubic inches.

The instant invention contemplates accommodation of a wide variety of electronic devices, such as smart phones, laptops, Global Positioning System devices, portable battery devices, etc.

In a further exemplary aspect, sealable opening 114 can be provided as and/or with any desired structure or combination of structures insofar as functionally compatible with the present invention. Such an opening can be sealable via a zipper 114 as illustratively shown in FIG. 1, a lid 114 as illustratively shown in FIG. 2, a rotatable lid, a clasp, a door, etc. Accordingly, opening 114 can have a closed state as illustratively shown in FIG. 1, such that any items contained in cavity 111 can be sealed therein, and an open state as illustratively shown in FIG. 2, such that any intended items can be placed within, or removed from, the cavity.

In yet another exemplary aspect, wireless power transmitter 120 can be securely fixed to outer surface 113, directly or indirectly, via any one or more desired structures functionally consistent with the present invention. As illustratively shown in FIG. 1, container 110 can include a magnet 115 fixed to outer surface 113, wherein transmitter 120 includes a ferromagnetic portion for fixation thereto. Alternatively, transmitter 120 can include a magnetic portion and container 110 can be formed of a ferromagnetic material or provided with a ferromagnetic portion. Notably, transmitter 120 can alternatively be fixed to outer surface 113 via a hook and loop combination, adhesive material, screw combination (e.g., the transmitter 120 itself can screw around or into container 110, or can be fixed with a separate screw), pin-catch combination, or any other fixation structure insofar as functionally consistent with the present invention.

In another exemplary aspect, transmitter 120 can be located remotely from container 110, which can be functionally consistent based on the particular wireless power technology selected for transmitter and receiver 120, 130.

In still another exemplary aspect, wireless power receiver 130 can be positioned within cavity 111, and in electrical communication with electronic device 112. Notably, wireless power receiver 130 can be separate from or incorporated into electronic device 112. Such electrical communication can be hardwired (such as via a cable 131) or wireless, such as where receiver 130 is a wireless power transceiver, for example and not in limitation.

In another exemplary aspect of the present invention, transmitter 120 and receiver 130 can cooperatively communicate power from the transmitter, through container 110, and to the receiver. As noted above, container 110 can provided as a Faraday container.

In an exemplary aspect, transmitter 120 can be provided with electrical current via a power source, such as for example and not in limitation, a transformer, a wall outlet, or any other functionally compatible electrical source; and therewith communicate the same to receiver 130, which can provide power to electronic device 112 disposed within cavity 111. Accordingly, electronic device 112 can use such power for operation and/or for charging an associated battery for subsequent use.

As illustrated in FIG. 2, container 110 can optionally include a cushioning insert 116 having plural compartments 116A to securely hold plural devices, such as a tablet computer, smartphone, etc. Further optionally, compartments 116A can include individual receivers 130 insofar as desired.

It will be apparent to one of ordinary skill in the art that the manner of making and using the claimed invention has been adequately disclosed in the above-written and attached description of the exemplary embodiments and aspects of the present invention.

It should be understood, however, that the invention is not necessarily limited to the specific embodiments, aspects, arrangement, and components shown and described above, but may be susceptible to numerous variations within the scope of the invention. For example, the present invention contemplates the utilization of one or more wireless power transmitters, as well as one or more wireless power receivers, in a single container insofar as desired and functionally consistent with the present invention.

Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents apparent to one of ordinary skill in the art.

Therefore, I claim:

1. A wireless charging Faraday container, comprising:
   a Faraday container formed of a conductive material defining a cavity therein, said container having a sealable opening having an open state that exposes the cavity for placement of an electronic device within the cavity, and a closed state that seals the electronic device within the cavity;
   a wireless power transmitter positioned outside the cavity, said transmitter being configured to receive electrical current from a power source; and
   a wireless power receiver positioned within the cavity and in wireless electrical communication with said transmitter;
   wherein said transmitter is configured to convert the received electrical current to wireless energy and to transmit the wireless energy, from outside of the cavity, through the material to said receiver, and said receiver is configured to receive and convert the wireless energy to electricity and to provide the electricity to the at least one electronic device.

2. The device of claim 1, wherein the material is non-porous.

3. The device of claim 1, wherein the material includes an insulating material.

4. The device of claim 1, wherein the closed state provides a water resistant seal.

5. The device of claim 1, wherein the received electrical current is direct current.

6. The device of claim 1, wherein the received electrical current is alternating current.

7. The device of claim 1, wherein the cavity is at least 20 cubic inches.

8. The device of claim 1, wherein the cavity is at least 25 cubic inches.

* * * * *